Dec. 30, 1952     D. F. WALKER     2,623,691

ELECTRICAL COMPUTING INSTRUMENT

Filed Dec. 12, 1951     2 SHEETS—SHEET 1

Inventor
Donald F. Walker
By Young, Emery, & Thompson
Attorneys

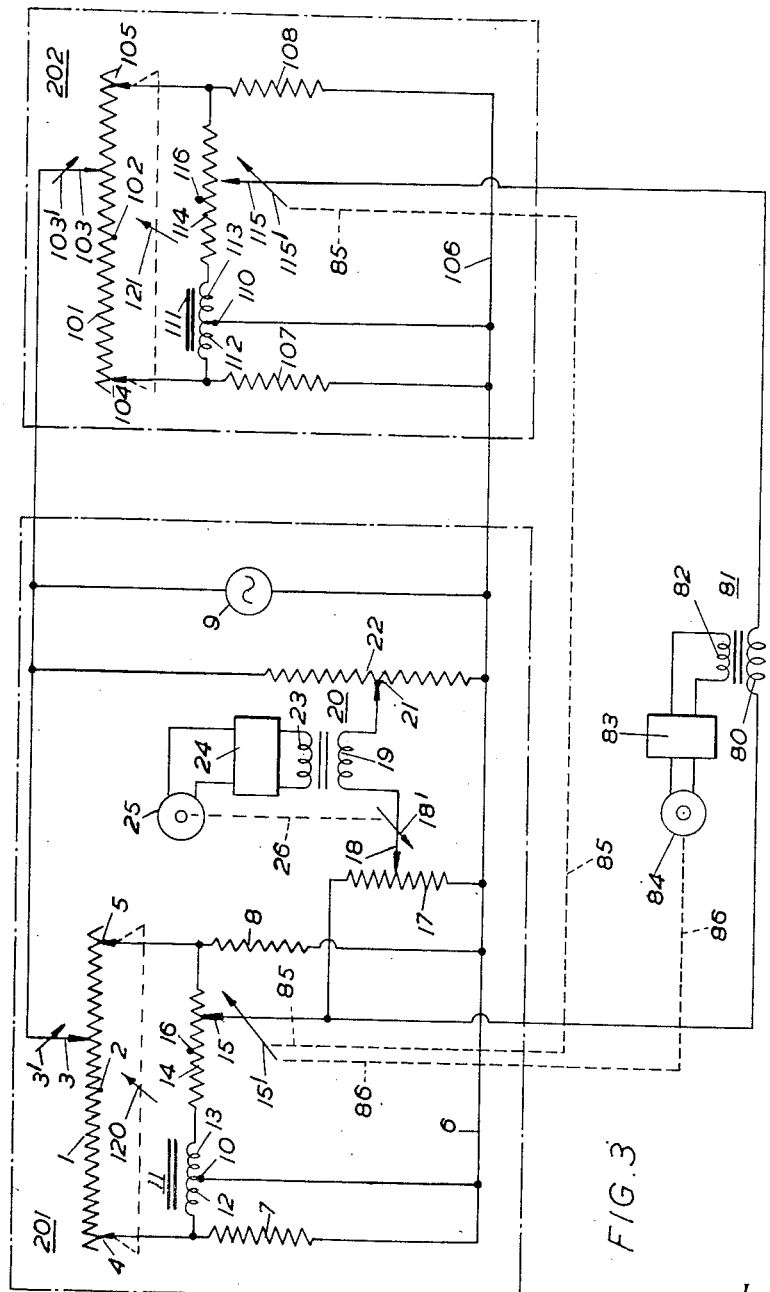

Patented Dec. 30, 1952

2,623,691

UNITED STATES PATENT OFFICE 2,623,691

ELECTRICAL COMPUTING INSTRUMENT

Donald Ferguson Walker, Hollinwood, England

Application December 12, 1951, Serial No. 261,217
In Great Britain May 21, 1947

5 Claims. (Cl. 235—61)

1

This application is a continuation in part of my application Serial No. 27,990 filed May 19, 1948, for "Electrical Computing Instruments," now Patent No. 2,608,345.

This invention relates to electrical computing instruments for radio navigational systems and is a continuation-in-part of co-pending application No. 27,990, series of 1948, now Patent No. 2,608,345. The latter application—which will hereinafter be referred to as the prior application—relates to electrical computing instruments of the kind adapted for indicating or deriving the value of an unknown quantity of a problem from three known quantities when these quantities are capable of being represented by sufficient information of the lengths of sides or values of angles to determine a triangle uniquely. In a particular example given in the prior application, the three known quantities were (a) the length of a first side of a triangle, (b) the length—which may be positive or negative—obtained by subtracting the length of the second side from the length of the third side, and (c) the value of the angle between the first and second sides, the unknown quantity being the length of the second side.

In the radio navigational systems with which the present application is concerned the information received by an aeroplane or other craft is in the form of (1) a first time-interval between signals radiated from a master station and a first slave station, and (2) a second time-interval between signals radiated from the same master station and a second slave station. All three stations are fixed in position and their locations are known, whilst the information to be determined is the distance and bearing of the master station. As will be shown in more detail hereinafter, this information may be represented by two triangles sharing a common side. In each of these two triangles the above-mentioned quantities (a) and (b) are known and each triangle is to be this extent suitable for solution by an electrical computing instrument of the kind described in the prior application. A difficulty however rises from the fact that the quantity (c) is not known.

The object of the present invention is to provide for a radio navigational system an electrical computing instrument for automatically and continuously deriving from the information (1) and (2) above referred to the distance and bearing of the master station for visible indication thereof or for application to a further computer stage.

2

Figure 1:
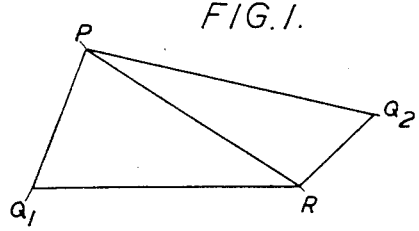
Figure 2:
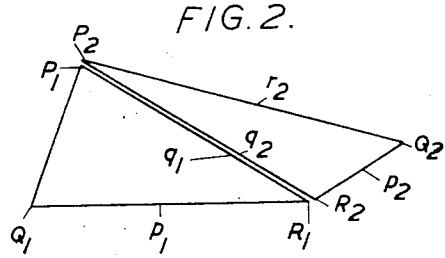

In the accompanying drawings
Figures 1 and 2 are diagrams to illustrate the principle of the invention, and Figure 3 is a schematic diagram of connections to illustrate one embodiment of the invention.

The invention may be carried out by way of example in connection with a radio navigational system in which the information received by an aircraft at P—see Figure 1—is in the form of (1) a first time-interval between pulse signals radiated from a fixed master station at R and first fixed slave station at $Q_1$, and (2) a second time-interval between pulse signals radiated from the same matster station at R and a second fixed slave station at $Q_2$. Pulses are transmitted cyclically from these stations, each cycle comprising pulses transmitted in the following order: (i) a pulse from the master station at R; (ii) a pulse from the slave station at $Q_1$; (iii) another pulse from the master station at R; and (iv) a pulse from the slave station at $Q_2$. The time intervals between the transmission of successive pulses are very accurately adjusted to constant known values. This type of radio navigational system is well known.

All four pulses of each cycle are received by equipment on the aircraft and displayed on a cathode ray tube screen so that the first time-interval above referred to can be determined from the spacing between pulses (i) and (ii) and the second time-interval from the spacing between pulses (iii) and (iv).

The principle of the invention may be understood from consideration of Figure 2, in which the diagram $PQ_1RQ_2$ of Figure 1 is divided into two triangles $P_1Q_1R_1$ and $P_2Q_2R_2$, the common side PR of Figure 1 being for clarity shown as two closely adjacent parallel sides $P_1R_1$ and $P_2R_2$. In the subsequent discussion the geometrical convention will be observed of referring to the angles of a triangle by the capital letters adjacent thereto and the sides opposite these angles by the corresponding lower case letters.

In the triangle $P_1Q_1R_1$ the known quantities are: (a) the length of the side $P_1$, this being the known fixed distance between the master station and the first slave station; and (b) the length $(r_1-q_1)$, this being derived from the first time-interval. Assuming for the moment that the value of the angle $R_1$ is also known, the triangle $P_1Q_1R_1$ may be solved as regards determining the length of $q_1$ by a computer as described with reference to Figure 2 of the drawings accompanying the prior application.

Similarly with the triangle $P_2Q_2R_2$. The known quantities in this case are (a) the length $p_2$ and (b) the length $(r_2-q_2)$, the latter being derived from the second time-interval. It is assumed for the moment that the angle $R_2$ is also known.

The electrical computing instrument in accordance with the invention therefore includes first and second components each of which comprises a computer as described with reference to Figure 2 of the prior application, certain items of equipment being common to both components. Such an arrangement is shown in Figure 3 of the accompanying drawings, the first component being at 201 and the second at 202. In this arrangement the various parts of first component 201 are designated by reference numbers 1 to 26 which correspond to the reference numbers applied to the similar parts of the computer described with reference to Figure 2 of the prior application; this equipment will accordingly not be described in detail here. Second component 202 includes parts 101 to 116 which are similar to parts 1 to 16 (except 9) of the first component 201. Supply source 9 is common to both components, conductor elements 6 and 106 being joined to form one conductor element. The apparatus designated by references 17 to 26 of first component 201 is not duplicated for second component 202 but is shared by both components in a manner that will be apparent later.

Tappings 15 and 115 are connected by way of the primary 80 of a transformer 81, the secondary 82 of which is connected by way of an amplifier 83 to a reversible motor 84. First and second angular controls $15^1$ and $115^1$ are ganged, as indicated in the broken line 85, so that the sum of the angles $\theta_1$ and $\theta_2$ represented by the positions of tappings 15 and 115 is always equal to the constant angle subtended by the slave stations at the master station, i. e. by the constant angle $Q_1RQ_2$ of Figure 1. The positions of these tappings is controlled by motor 84 by some convenient linkage indicated by the broken line 86.

The value of the resistance between mid-point 2 and conductor element 6 by way of resistance 7 or 8 is made proportional to the fixed length $p_1$ to a certain scale. The value of the resistance between mid-point 102 and conductor element 106 by way of resistance 107 or 108 is made proportional to the fixed length $p_2$ to the same scale.

In operation, the navigator maintains first and second linear controls $3^1$ and $103^1$ in such correspondence with the spacings between pulses (i) and (ii) and between pulses (iii) and (iv), respectively, that the resistances between tapping 3 and mid-point 2 and between tapping 103 and mid-point 102 are proportional to the lengths $(r_1-q_1)$ and $(r_2-q_2)$ respectively, to the scale above referred to. From the description given in the prior application of the operation of the computer described with reference to Figure 2 of that application it will be appreciated that if the angle $R_1$ were known, as was assumed above, and if first angular control $15^1$ were adjusted accordingly, the first output voltage between tapping 15 and conductor element 6 would be proportional to $1/q_1$ and the motor 25 would so adjust output control $18^1$ as to maintain the position of tapping 18 proportional to $q_1$, thus indicating the distance from the aircraft to the master station.

The angle $R_1$ is however not known directly. The position of angular control $15^1$ is nevertheless maintained in conformity with this angle by means of second component 202 and the equipment designated by reference 80 to 86, as follows.

From the above description it will be seen that if second angular control 115 were maintained in conformity with the angle $R$ the second output voltage between tapping 115 and conductor element 106 would be proportional to $1/q_2$. But $q_2$ is equal to $q_1$, since both are a measure of the length of the common side $P_1R_1$, $P_2R_2$, of the two triangles shown in Figure 2. When therefore the positions of controls $15^1$ and $115^1$ are in conformity with the angles $R_1$ and $R_2$ the output voltages on tappings 15 and 115 are equal, and no current flows in primary 80 of transformer 81 to actuate motor 84. For all other positions of these controls the output voltages are not equal, and an out-of-balance current flows to actuate the motor. The direction in which this current flows, and in consequence the direction in which the motor rotates, are dependent on the sense of this voltage difference; the equipment is so arranged that the direction of rotation of the motor is always such as to tend to reduce the difference between the output voltages; that is to say, the direction of rotation is always such as to adjust the controls towards the positions in which they represent respectively the angles $R_1$ and $R_2$. As soon as these positions are reached the output voltages become equal, the out-of-balance current ceases to flow, and motor 84 ceases to operate.

It will therefore be appreciated that whilst the positions of first and second linear controls $3^1$ and $113^1$ are continually maintained in accordance with the lengths $(r_1-q_1)$ and $(r_2-q_2)$, as described above, the motor maintains first and second angular controls $15^1$ and $115^1$ in accordance with the angles $R_1$ and $R_2$, and the motor maintains the position of output control $18^1$ in accordance with the length $q_1$, from which the required distance of the aircraft from the master station is readily determined.

The bearing at the aircraft of the master station is determined by merely adding to the angle $R_1$ a constant angle dependent on the bearing at the master station of the first slave station. The first cosine potentiometer 14 may for convenience be calibrated to read the bearing of the master station direct, rather than the angle $R_1$.

As controls $15^1$ and $115^1$ are constantly maintained so that the output voltages on tappings 15 and 115 are equal, it is not necessary to provide for the second component 202 the apparatus—corresponding to that indicated by references 17 to 26 of first component 201—necessary for deriving the quantity $q_2$ from the output voltage on tapping 115.

The invention is not limited to the embodiment described above, which is for illustrative purposes only. In particular, the components 201 and 202 may take different forms, such for instance as any of those described with reference to Figures 3 to 8 of the drawings accompanying the prior application. One such modification is actually shown in Figure 3 of the present specification viz., the resistances 7, 8, 107, 108 instead of being connected to fixed points at 4, 5, 104, 105, on the resistances 1 and 101, are shown adjustable for which purpose 4, 5, are variable tappings ganged under a control 120 to move in opposite directions thereby maintaining the resistance between the mid-point 2 and tapping 4 always equal to the resistance between the mid-point 120 and tapping 5. Similarly 104, 105 are variable tappings ganged under a control 121. The controls 120, 121 are manually adjustable. This construction enables the operator to adjust the apparatus to suit various lengths of base lines between master and slave stations and so permit the apparatus to be used with a number of such navigational systems instead of just one.

I claim:

1. An electrical computing instrument for deriving from a first time-interval between signals radiated from a fixed master station and a first fixed slave station and a second time-interval between signals radiated from the same master station and a second fixed slave station, the distance and bearing of said master station from said instrument, comprising a first component including a first uniform resistance having two connecting points symmetrically disposed with respect to its mid-point, a first variable tapping for said resistance, a first linear control means associated with said variable tapping, a conductor element, equal impedance means connecting said two connecting points respectively to said conductor element for yielding potentials $v_1$ and $v_1^1$ proportional to the currents flowing through them respectively, means for applying a voltage proportional to $(v_1+v_1^1)$ to a first cosine potentiometer, and a first angular control means which is associated with said potentiometer, which thus yields a first output voltage proportional to $\frac{1}{2}(v_1+v_1^1)(1-\cos\theta_1)$ with reference to one end of said potentiometer where $\theta_1$ is the angle represented by the position of said angular control means; a second component including a second uniform resistance having two connecting points symmetrically disposed with respect to its mid-point, a second variable tapping for said second resistance, a second linear control means associated with said second variable tapping, equal impedance means connecting said two connecting points of said second uniform resistance respectively to said conductor element, for yielding potentials $v_2$ and $v_2^1$ proportional to the currents flowing through them respectively, means for applying a voltage proportional to $(v_2+v_2^1)$ to a second cosine potentiometer, and a second angular control means which is associated with said second potentiometer, which thus yields a second output voltage proportional to $\frac{1}{2}(v_2+v_2^1)(1-\cos\theta_2)$ with reference to one end of said second potentiometer, where $\theta_2$ is the angle represented by the position of said second angular control means; a source of electrical energy one pole of which is connected to said first and second variable tappings and the other pole of which is connected to said conductor element, a first reversible motor for adjusting said first and second angular control means in such manner that the sum of the angles $\theta_1$ and $\theta_2$ is always equal to the fixed angle subtended by said slave stations at said master station, means for deriving a current in dependence on any difference between said first and second output voltages, the direction of flow of said current at any given instant being dependent on the sense of said difference at that instant, means for utilizing said current to drive said first reversible motor in a direction dependent on the direction of flow of said current to effect maintenance of said output voltages equal; a linear potentiometer having a variable tapping, an output control means associated with said last-mentioned tapping, interconnections between said linear potentiometer, said impedance means for yielding a potential $v_1^1$, and said first cosine potentiometer, for applying across said linear potentiometer a difference voltage proportional to the difference between said potential $v_1^1$ and said first output voltage, means for providing a reference voltage in direct dependence on said source, connections for deriving an out-of-balance current from the difference between the output voltage of said linear potentiometer and said reference voltage, and a second reversible motor actuated by said out-of-balance current for adjusting said output control means when said first and second linear control means are pre-set in dependence on said first and second time-intervals respectively, in order to bring the quantity represented by the position of said output control means into proportional relationship with the distance from said instrument to said master station.

2. An electrical computing instrument as claimed in claim 1 wherein each of said impedance means comprises a resistance.

3. An electrical computing instrument as claimed in claim 1 wherein at least one of said means for applying a voltage to a cosine potentiometer includes a reversing transformer.

4. An electrical computing instrument as claimed in claim 1 wherein said two points on each of said uniform resistances are variable tappings, and tapping controls are provided one for each said two points, each said controls being ganged to move said variable tappings in opposite directions.

5. An electrical computing instrument as claimed in claim 1 wherein said means for providing a reference voltage is a potentiometer energized by said source.

DONALD FERGUSON WALKER.

No references cited.